United States Patent
Yang

(10) Patent No.: US 8,594,495 B2
(45) Date of Patent: Nov. 26, 2013

(54) SHORT-RANGE PHOTOGRAPHIC LIGHT SOURCE MODULE FOR USE IN IMAGE CAPTURE DEVICE AND IMAGE CAPTURE DEVICE PROVIDED WITH SAME

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 0 days.

(21) Appl. No.: 13/428,674

(22) Filed: Mar. 23, 2012

(65) Prior Publication Data

US 2012/0243860 A1    Sep. 27, 2012

(30) Foreign Application Priority Data

Mar. 24, 2011    (TW) .............................. 100205220 U

(51) Int. Cl.
*G03B 15/06* (2006.01)
*G03B 15/02* (2006.01)
*H04N 5/222* (2006.01)

(52) U.S. Cl.
USPC .............................. 396/199; 348/370; 362/11

(58) Field of Classification Search
USPC .................. 396/199; 348/370; 362/3, 11, 140
See application file for complete search history.

(56) References Cited

U.S. PATENT DOCUMENTS

| 7,821,569 | B2 | 10/2010 | Yang | |
|---|---|---|---|---|
| 2007/0047947 | A1* | 3/2007 | Huang et al. | 396/199 |
| 2008/0180950 | A1* | 7/2008 | Kang et al. | 362/252 |
| 2010/0284184 | A1 | 11/2010 | Yang | |
| 2012/0039593 | A1 | 2/2012 | Yang | |
| 2012/0075861 | A1 | 3/2012 | Yang | |

* cited by examiner

Primary Examiner — Clayton E LaBalle
Assistant Examiner — Noam Reisner

(57) ABSTRACT

The invention provides a short-range photographic light source module for use in an image capture device and the image capture device provided with the same. The image capture device comprises an imaging lens having a light axis. The short-range photographic light source module is mounted in correspondence at the imaging lens to serve as a light source when the image capture device is capturing an image of a target object at a short range. The module further includes a sleeve tube having a rear end portion, a front end portion, an interior side connecting the front end portion to the rear end portion, a light shield portion, and a first illuminating unit and a second illuminating unit.

14 Claims, 6 Drawing Sheets

SHORT-RANGE PHOTOGRAPHIC LIGHT SOURCE MODULE FOR USE IN IMAGE CAPTURE DEVICE AND IMAGE CAPTURE DEVICE PROVIDED WITH SAME

BACKGROUND OF THE INVENTION

1. Field of the Invention

The present invention relates to a short-range photographic light source module and, more particularly, to a short-range photographic light source module for use in an image capture device.

2. Description of Related Art

The macro photography refers to a photographic mode for capturing an image of a short-range object or a very tiny object, typically produced at a reproduction ratio ranging from 1:1 to 1:4. Herein the ratio "1:4" means that the image size thus produced is a quarter of the actual object size. By reaching a reproduction ratio of 1:1, the actual size of the target object can be completely captured and presented. From the aspect of application, in addition to conventional applications in ecological observation and scientific research, the technique of macro photography can be more comprehensively utilized in various fields, including medical cosmetic surgery, criminal identification or anti-counterfeit verifications, such as fingerprint verification, paper bill anti-counterfeit authentication, and even identification of blood stains or body fluids by detection of fluorescent proteins present in body fluid and blood.

However, as the photographic distance further reduced, the aperture has to be set on a lower setting, thereby maintaining a sufficient depth of field to achieve a range of clearance for the target object. Meanwhile, with a small angle of view, light entering into the lens is at a low intensity level. Apparently, if the aperture is adjusted to be smaller, the intensity of light would get lower, resulting in darkness of the captured images which cannot be effectively analyzed or verified. To overcome this problem, one approach is to significantly extend the shutter open time. Unfortunately, in the case where the target object slightly moves or the image capture device itself sways during the shutter open time, the resulted image would become obscure or even completely unidentifiable. Another approach is to additionally install an external flashlight at the front end of the camera, so as to resolve this light insufficiency problem by means of light supplementation. But the flashlight can transiently provide light source only at the moment of shooting. Especially, for short-range photography, the control of exposure to light is very challenging and tends to cause the over-exposure or under-exposure problems. In such case, the pictures taken in this way may appear awkward and unnatural.

Furthermore, for specific target objects, such as a fingerprint left on a glass plate, light emitted by the flashlight and directly reflected from the glass plate may be much brighter than the fingerprint image itself and, thus, may entirely hinder the weak diffusion light from the fingerprint. Besides, for example, during an operation of searching for blood traces splashed on the ground in an area of intensive sunlight, the attempt to effectively identify the fluorescent reaction of blood traces by using a ultra-violet (UV) light source may fail due to strong UV emission in sunlight which seriously deteriorates the quality of images. Consequently, issues concerning how to adequately illuminate the image area intended to be captured, to provide accurate light supplementation at a selected angle without the occurrence of over-exposure, and even to arbitrarily choose a suitable light source of light supplementation to achieve an expected shadow effect to thereby enhance the three-dimensional perception of the target object, are to be effectively resolved by the short-range photographic light source module according to the invention.

On the other hand, in the case of money authenticity verification, for example, some hidden anti-counterfeit mechanisms need be magnified and verified with visible light, while the remained fluorescent anti-counterfeit mechanisms should be illuminated by UV light. For the situation where two different types of light sources are required for photography in one occasion, the two types of external light sources have to be switched frequently to capture different types of images of the target object. This not only forces the user to prepare two different types of light sources at the same time, but causes alignment problem in the captured picture due to light source alternations during a photographic operation. Hence, the aforementioned issues are also to be addressed by the invention.

SUMMARY OF THE INVENTION

An objective of the invention is to provide a short-range photographic light source module having a light shield portion which can block out the interference caused by intensive ambient light and stray light, thereby increasing the quality of the captured images.

Another objective of the invention is to provide a short-range photographic light source module having light sources with different central wavelengths from each other, so as to offer switchable different light sources with the single light source module.

Still another objective of the invention is to provide a short-range photographic light source module having ring-wisely configured illuminating units so as to provide uniform light supplementation on a target object at a close distance thereby improving the imaging quality of the object.

Yet another objective of the invention is to provide a short-range photographic light source module having illuminating units with different light-emitting directions, so as to allow choices of light supplementation angle conforming to actual requirements of the target object as well as the photographic environment.

Yet still another objective of the invention is to provide an image capture device provided with the short-range photographic light source module disclosed herein, wherein the short-range photographic light source module includes a light shield portion which can block out the interference caused by intensive ambient light and stray light, thereby increasing the quality of the captured images.

Further still another objective of the invention is to provide an image capture device provided with the short-range photographic light source module disclosed herein, which allows the photographer to freely select the light sources and illumination angles required for the target object and the photographic environment, thereby improving the convenience and application flexibility of photography.

To achieve such objectives, the invention provides a short-range photographic light source module for use in an image capture device. The image capture device comprises an imaging lens having a light axis. The short-range photographic light source module is mounted at a position corresponding to the imaging lens and serves as a light source when the image capture device is capturing an image of a target object at a short distance. The short-range photographic light source module comprises:

a sleeve tube, extending along the central axis and being engageable with the image capture device, wherein the sleeve tube comprises a rear end portion adapted to be arranged close to the imaging lens, a front end portion opposite to the rear end portion and remote from the image capture device, an interior side connecting the front end portion to the rear end portion, and a light shield portion close to the front end portion; and a first illuminating unit, mounted on the interior side of the sleeve tube to emit light with a first central wavelength in a direction corresponding to the central axis; and a second illuminating unit, mounted on the interior side of the sleeve tube to emit light at an angle with respect to the central axis, wherein the light emitted from the second illuminating unit has a second central wavelength different from the first central wavelength.

In summary, by installing the short-range photographic light source module disclosed herein onto the image capture device, it is possible to, on one hand, take short-range images, and, on the other hand, further adjust the light supplementation angle such that the target object can be accurately light supplemented to obtain the best photographic effect. In particular, it permits the user to selectively use one or both of the two illuminating units based on the characteristics of the target object, thereby greatly increasing convenience in use to achieve the aforementioned objectives.

DETAILED DESCRIPTION OF THE PREFERRED EMBODIMENTS

The aforementioned and other technical contents, aspects and effects in relation with the present invention can be clearly appreciated through the detailed descriptions concerning the preferred embodiments of the invention in conjunction with the appended drawings.

Figure 1:
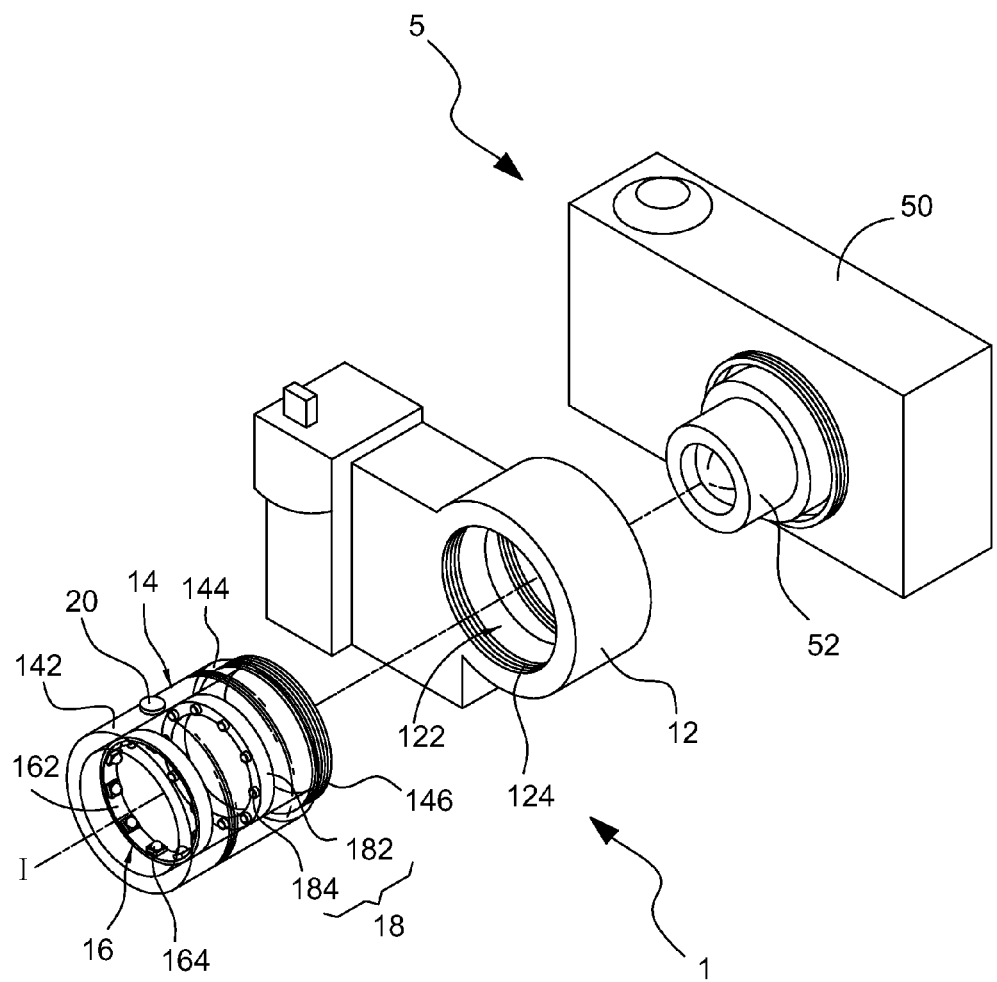
FIG. 1 shows a perspective view of a short-range photographic light source module according to the first embodiment of the invention.
Figure 2:
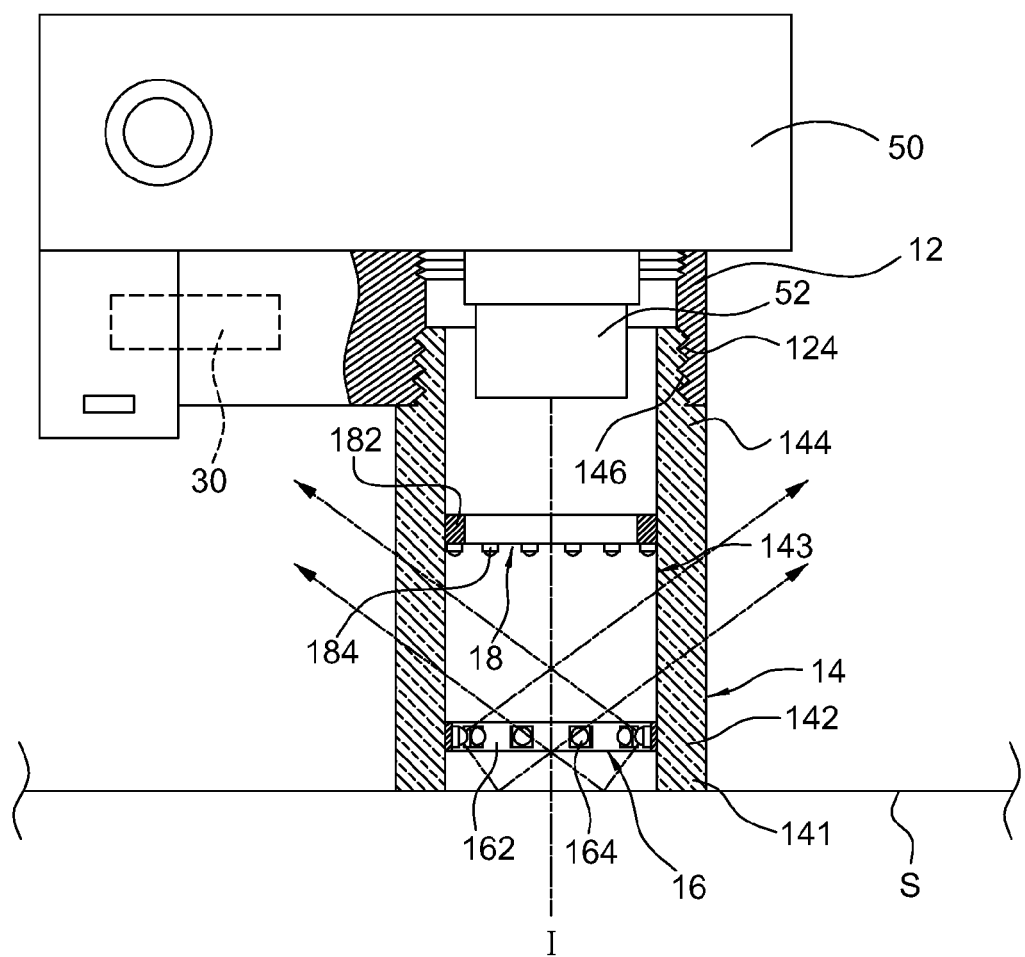
FIG. 2 shows a cross sectional view of the short-range photographic light source module of FIG. 1.

FIGS. 1 and 2 show the first preferred embodiment according to the invention, wherein the short-range photographic light source module 1 is operated in conjunction with an image capture device 5 exemplified as a camera. In this embodiment, the short-range photographic light source module 1 is adapted in front of an imaging lens 52 on the image capture device 5 and acts as a light supplementation light source for short-range photography with the image capture device 5. In this embodiment, the image capture device 5 is exemplified as a single-lens camera comprising the imaging lens 52 and a device body 50, wherein the imaging lens 52 has a light axis (not shown), but in practice it is by no means limited thereto.

The short-range photographic light source module 1 herein comprises an adapter base 12, a sleeve tube 14, a first illuminating unit 16 and a second illuminating unit 18. Herein the adapter base 12 according to this embodiment is formed with a through hole 122. In addition, external threads are formed on the periphery of the imaging lens 52 of the image capture device 5, and corresponding internal threads are formed on the sidewall of the through hole 122 in the adapter base 12 for thread engagement. When the imaging lens 52 is configured in the form of a retractable lens, it can stretch into the through hole 122 as well. Moreover, internal threads 124 is further formed of the through hole 122 of the adapter base 12 is formed on its sidewall at a position remote from the imaging lens 52 for thread engagement with the sleeve tube 14 at the front side. For the purpose of illustration, in this embodiment, the symmetry axis of the through hole 122 is defined as a central axis I.

The sleeve tube 14 herein is exemplified as a circular tube extending along the direction of the central axis I. The sleeve tube 14 comprises a rear end portion 144 close to the imaging lens 52, a front end portion 142 opposite to the rear end portion 144 and remote from the image capture device 5, an interior side 143 connecting the front end portion 142 to the rear end portion 144, and a light shield portion 141 near the front end portion 142. The light shield portion 141 is made of opaque material. The front end portion 142 of the sleeve tube 14 is configured to have a flat surface such that, in the case where the target object is a glass plate having a flat surface as described above, the front end portion 142 is allowed to be in close contact with the flat surface of the target object. The light shield portion 141 can block out ambient light interference, thereby effectively preventing strong ambient light from entering into the imaging lens 52 of the image capture device 5 and overcoming the problem that noise light becomes more intensive than the acquired image data. In this embodiment, the rear end portion 144 is formed on its outer wall with external threads 146, such that the sleeve tube 14 can be correspondingly threadedly engaged with the internal threads 124 of the adapter base 12.

A person skilled in the art will appreciate that the light shield portion 141 can be a bumper ring made of, for example, colored rubber material. Accordingly, when the image capture device 5 installed with the short-range photographic light source module 1 is used for photography, it can be held to stand on a surface S with the light shield portion 141 of the sleeve tube 14 being in close contact with the surface S. By abutting against the surface S, the light shield portion 141 blocks out ambient stray light and stabilizes the image capture device 5, so that the variation of close-up range or the problem of image obscurity due to slight sways of hands can be remarkably reduced, thereby resolving the difficulty in short-range photography.

The first illuminating unit 16 comprises a first ring belt 162, on which a plurality of first light emitting diode (LED) elements 164 are mounted. Similarly, the second illuminating unit 18 comprises a second ring belt 182 separately arranged from the first ring belt 162, on which a plurality of second light emitting diode elements 184 are mounted. In this embodiment, the first ring belt 162 and the second ring belt 182 are both in the form of a flexible printed circuit board, so that they can be conveniently bent and placed within the sleeve tube 14 after installation of the first LED elements 164 and the second LED elements 184 thereon. Especially, since LEDs are used in the illuminating units, it is possible to reduce power consumption and allow long duration of illumination on the photographic area, without being limited to conventional application of general flashlights.

Moreover, the first illuminating unit 16 emits light at a nearly right angle with respect to the central axis I. Since the LEDs are configured to emit light within an expanded three-dimensional angle of light emission, the main light beams from the first LED elements 164 are not emitted directly toward the front end portion 142. Therefore, the main light beams will not be reflected by the flat and even reflective surface of the target object and directly return back into the imaging lens 52, so that the saturation of the photo-sensing components in the image capture device 5 due to intensive reflection light is prevented.

That is, by means of the low-angle light source described above, only a small amount of diffusion light or multi-reflection light derived from the light emitted from the LED elements can be illuminated onto the surface of the target object and, thus, the reflected stray light is significantly reduce. Through this approach, the light supplementation light source disclosed herein can be readily utilized in a fingerprint detection on an object, such as a glass window, or a scratch detection on a smooth surface of an object, such as an integrated circuit, and clearly observe flaws occurring on the surfaces and edges. As such, the invention prevents obscurity in the captured images due to over-exposure to light and resolves the problem that the fingerprints or scratches required to be accurately recorded are otherwise become overly obfuscated and unidentifiable due to interferential stray light.

Additionally, in this embodiment, the second illuminating unit 18 is located behind the first illuminating unit 16 and emits light toward the front end portion 142 along a direction generally parallel to the central axis I. As such, the second illuminating unit 18 is referred to as a co-axial light source herein. The second illuminating unit 18 effectively illuminates the surface of the target object to be taken an image, in the case where the surface is not smooth enough or is of a low reflection coefficient. The co-axial light source renders the light emitted therefrom to distribute over the entire visual field. Since the low-angle light source and the co-axial light source can be used alone respectively or in combination with each other, the device disclosed herein can provide supplement light at various angles depending on the actual situation of the surface of the target object, thereby presenting the three-dimensional perception of the target object and achieving the best photographic effect.

The light emitted from the first LED elements 164 and the second LED elements 184 may be infrared light, visible light or UV light for illuminating different types of objects. The infrared light and UV light may be respectively applied to objects provided with infrared marks and ultraviolet marks, such as paper bills, for anti-counterfeit verifications. Besides, UV light may be used in conjunction with a fluorescent dye in a fluorescent analysis, such as an analysis for micro cracks on a metal surface.

The short-range photographic light source module 1 further comprises a switch unit 20. The switch 20 is placed on the outer perimeter of the sleeve tube 14 and electrically connected to the first illuminating unit 16 and the second illuminating unit 18 having mutually different central wavelengths of the emitted light and illumination angles. The user can selectively activate one or both of the LED units to generate the low-angle light source and/or the co-axial light source based on the characteristics of the target object, so as to create a shadow in a specific direction upon taking pictures, thereby clearly distinguishing the altitude of the target object to increase photographic flexibility of choice. Further, the switch unit 20 may be configured to provide adjustment function for adjusting the brightness of the first illuminating unit 16 and the second illuminating unit 18, respectively, so that the user can acquire images with the most suitable luminance adapted based on different photographic conditions.

The short-range photographic light source module 1 further comprises a power source unit 30 installed in the adapter base 12 and electrically connected to the first illuminating unit 16 and the second illuminating unit 18, thus providing required electric power for lighting of the illuminating units and providing consistent illumination on the area to be imaged. It should be noted that the power source unit 30 may by way of example be exemplified as a battery pack consisting of alkaline batteries.

Figure 3:
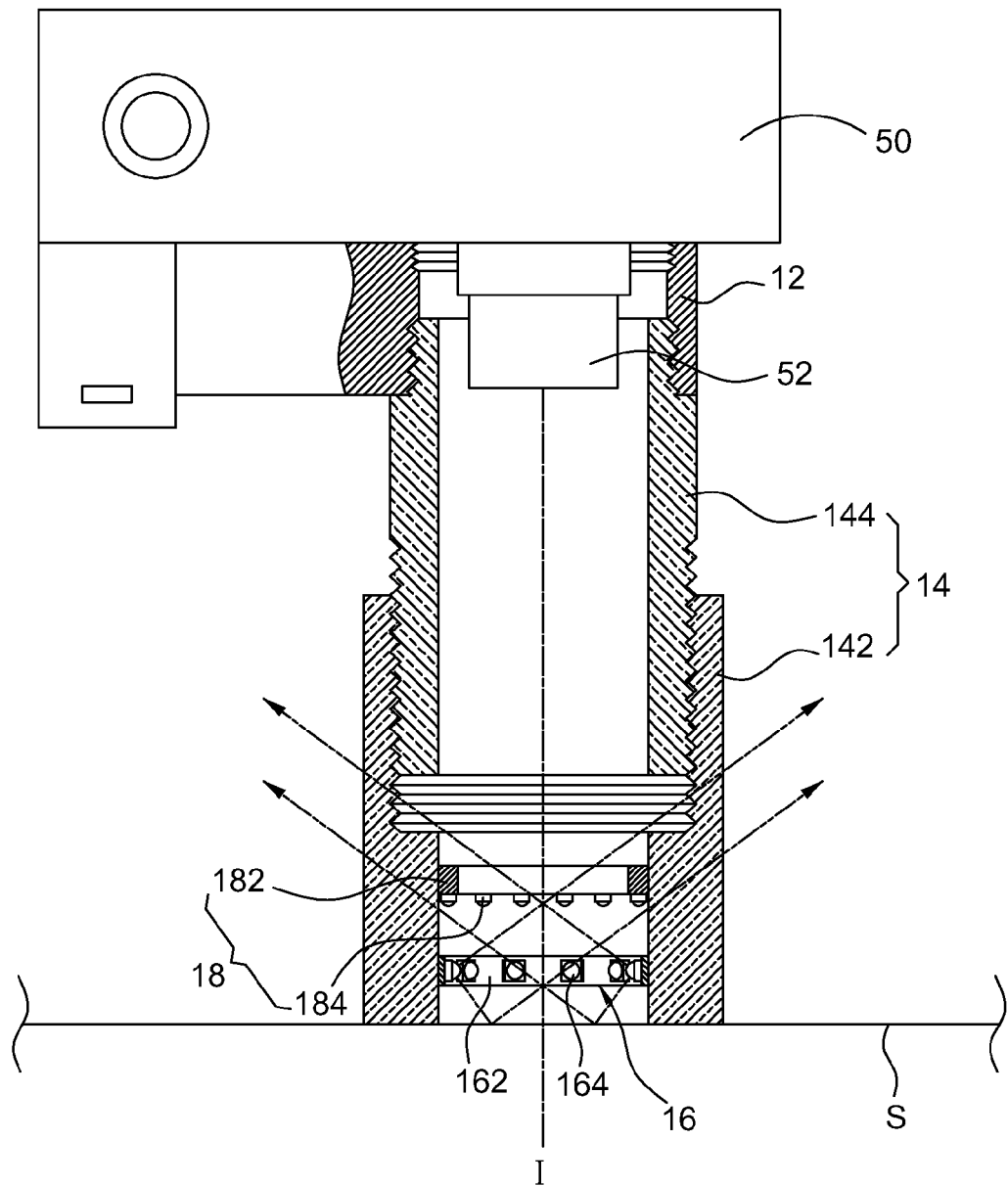
FIG. 3 shows a cross sectional view of a short-range photographic light source module according to the second embodiment of the invention.

Now Referring to FIG. 3, there is shown the second embodiment of the invention, in which the front end portion 142 is threadedly engaged with the rear end portion 144. According to this embodiment, the length of the sleeve tube 14 is adjustable by threadedly moving the front end portion 142 back and forth with respect to the rear end portion 144 along the central axis I. When the distance between the image capture device 5 and the target object should be changed in accordance with actual optical parameters of the image capture device 5, the overall length of the sleeve tube 14 can be conveniently adjusted by rotating the front end portion 142 in relation to the rear end portion 144.

Figure 4:
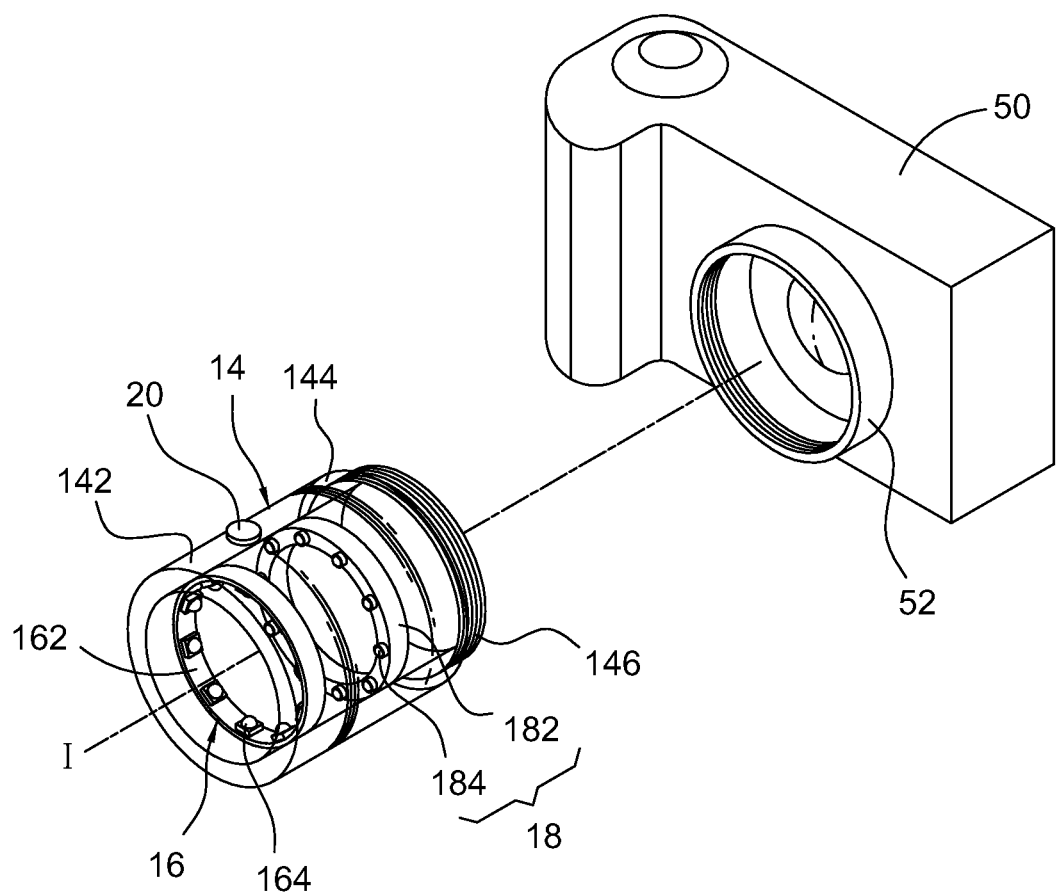
FIG. 4 shows a perspective view of a short-range photographic light source module according to the third embodiment of the invention.

Referring to FIG. 4, there is shown a short-range photographic light source module 1 according to the third embodiment of the invention, in which the sleeve tube 14 is directly adapted to the imaging lens 52 of the device body 50 in the absence of a adapter base. Electrical power is supplied to the first illuminating unit 16 and the second illuminating unit 18 from a power source mounted in the device body 50.

Figure 5:
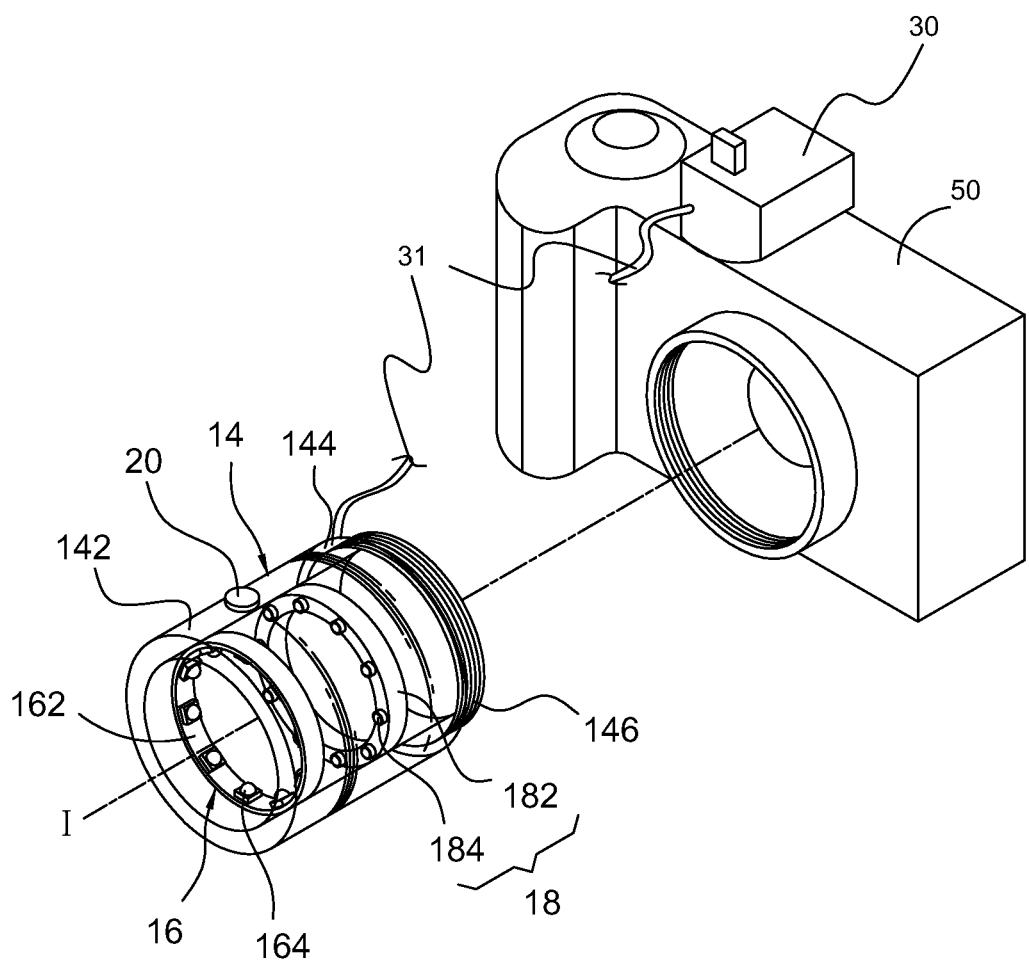
FIG. 5 shows a perspective view of a short-range photographic light source module according to the fourth embodiment of the invention.

Referring to FIG. 5, there is shown the fourth embodiment of the invention, in which the power source unit 30 is exemplified as a battery box mounted atop the device body 50 of the image capture device 5 and electrically connected to the short-range photographic light source module 1 through an external transmission wire 31 to activate the illuminating units for lighting.

Figure 6:
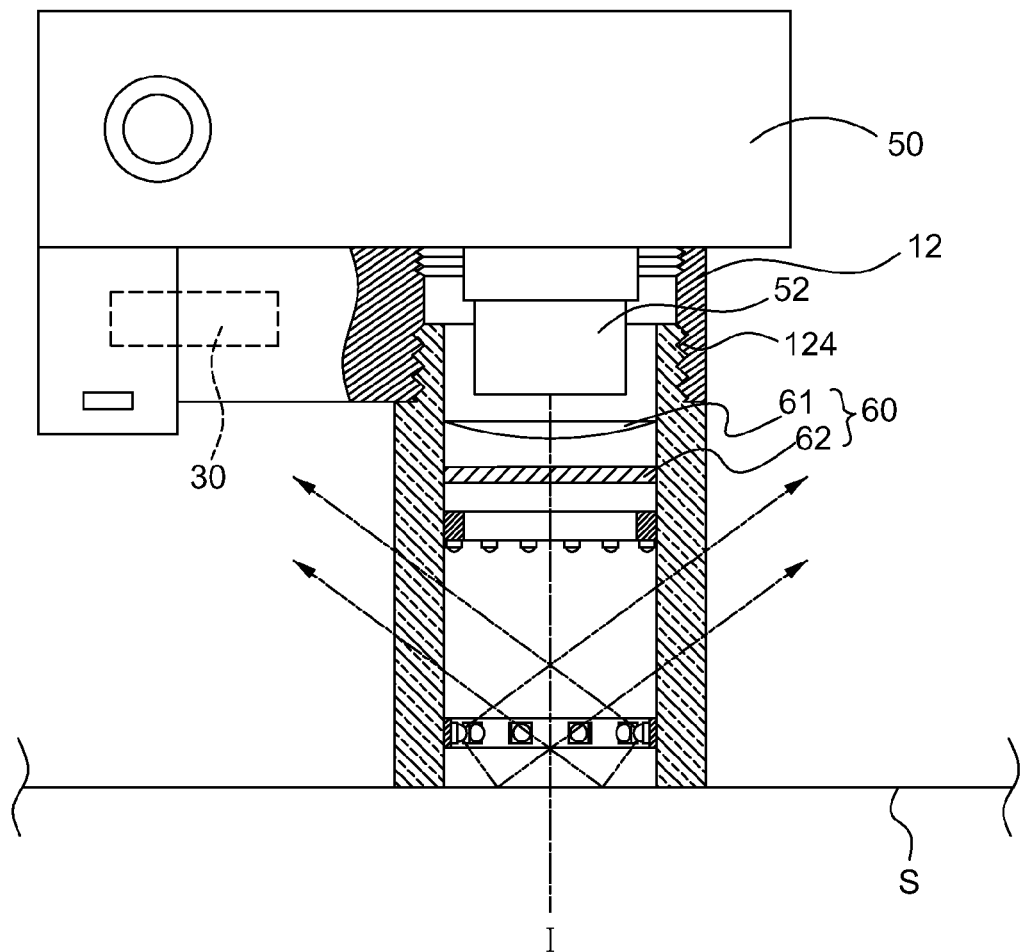
FIG. 6 shows a cross sectional view of a short-range photographic light source module according to the fifth embodiment of the invention.

Referring then to FIG. 6, there is shown the fifth embodiment of the present invention, in which the short-range photographic light source module 1 further comprises an optical lens unit 60 installed between the second ring belt and the rear end portion. In this embodiment, the optical lens unit 60 has a symmetry axis (not shown) extending along the light axis of the imaging lens 52 and comprises an optical lens assembly 61 and at least one filter 62 arranged in a manner corresponding to the imaging lens 52.

The optical lens assembly 61 is usually composed of several lenses which may be spherical or aspherical. In the Figure, it is briefly represented with a single convex lens. Certainly, the size, shape and number of such lenses may vary as required, and descriptions thereof are omitted for brevity. Moreover, the diopter in each of the lenses may differ as well. Typically, the greater the diopter is, the shorter the focusing distance becomes, so the magnification is increased and the resultant image of the target object accordingly becomes bigger. Consequently, the image of an outside object can be enlarged through the optical lens assembly.

The filter 62 may correspond to one of the illuminating units with a particular light emission wavelength, such that some portions of the emitted light may be absorbed or reflected in order to filter it out. For example, assuming that the light emitted by the illuminating unit is used to excite an object under test to emit fluorescent light or phosphorescent light, and the filter is able to absorb the UV light generated by ultraviolet LEDs and directly reflected back to the lens, then the filter is able to prevent the intensive reflection light from hindering the fluorescent light or phosphorescent light subject to detection and allow the light beams of specific wavelengths in the fluorescent light or phosphorescent light to enter into the imaging lens, thereby offering convenient observation for the user.

Although the present invention has been disclosed in accordance with the embodiments as previously illustrated, they are in every aspects not intended to limit the present invention; any skilled persons in the art can certainly make changes and modifications without departing from the spirit and range of the present invention, thus that the claimed scope of the present invention should be considered as being delineated by the claims set forth hereunder.

What is claimed is:

1. A short-range photographic light source module for use in an image capture device, the image capture device comprising an imaging lens having a light axis, wherein the short-range photographic light source module is mounted at a position corresponding to the imaging lens and serves as a light source when the image capture device is capturing an image of a target object at a short distance, the short-range photographic light source module comprising:
    a sleeve tube, extending along the central axis and being engageable with the image capture device, wherein the sleeve tube comprises a rear end portion adapted to be arranged close to the imaging lens, a front end portion opposite to the rear end portion and remote from the image capture device, an interior side connecting the front end portion to the rear end portion, and a light shield portion close to the front end portion;
    a first illuminating unit, mounted on the interior side of the sleeve tube to emit light with a first central wavelength in a direction corresponding to the central axis; and
    a second illuminating unit, mounted on the interior side of the sleeve tube to emit light at an angle with respect to the central axis, wherein the light emitted from the second illuminating unit has a second central wavelength different from the first central wavelength;
    wherein the first illuminating unit comprises a plurality of first light emitting diode (LED) elements and the second illuminating unit includes a plurality of second LED elements; and
    wherein the first LED elements are mounted on a first ring belt and the second LED elements are mounted on a second ring belt separated from the first ring belt, and wherein the short-range photographic light source module further comprises an optical lens unit mounted between the ring belts and the rear end portion and having a symmetry axis extending along the light axis.

2. The short-range photographic light source module according to claim 1, wherein the front end portion comprises a flat edge such that, in the case wherein the target object has a flat surface, the front end portion can be brought into a close contact with the flat surface of the target object and the light shield portion can block out ambient light interference.

3. The short-range photographic light source module according to claim 1, wherein the first ring belt and the second ring belt are both fabricated in the form of a flexible printed circuit board.

4. The short-range photographic light source module according to claim 1, wherein the optical lens unit comprises an optical lens assembly arranged in a manner corresponding to the imaging lens.

5. The short-range photographic light source module according to claim 1, wherein the optical lens unit comprises at least a filter for filtering at least one of the first central wavelength and the second central wavelength.

6. The short-range photographic light source module according to claim 1, further comprising an adapter base for connecting the sleeve tube to the image capture device, wherein the adapter base is formed with a through hole to accommodate the imaging lens.

7. The short-range photographic light source module according to claim 6, further comprising a power source unit mounted in the adapter base for controlling the respective illuminating units.

8. The short-range photographic light source module according to claim 1, further comprising a switch unit electrically connected to the illuminating units for activating the illuminating units.

9. The short-range photographic light source module according to claim 1, wherein the sleeve tube further comprises a rear end portion for engaging the image capture device and a front end portion capable of moving along the central axis with respect to the rear end portion.

10. An image capture device provided with a short-range photographic light source module, comprising:
    a device body;
    an imaging lens, mounted on the device body and having a light axis; and
    the short-range photographic light source module mounted at a position corresponding to the imaging lens and serving as a light source when the image capture device is capturing an image of a target object at a short distance, comprising:
    a sleeve tube, extending along the central axis and being engageable with the image capture device, wherein the sleeve tube comprises a rear end portion adapted to be arranged close to the imaging lens, a front end portion opposite to the rear end portion and remote from the image capture device, an interior side connecting the front end portion to the rear end portion, and a light shield portion close to the front end portion;
    a first illuminating unit, mounted on the interior side of the sleeve tube to emit light with a first central wavelength in a direction corresponding to the central axis; and
    a second illuminating unit, mounted on the interior side of the sleeve tube to emit light at an angle with respect to the central axis, wherein the light emitted from the second illuminating unit has a second central wavelength different from the first central wavelength;
    wherein the first illuminating unit comprises a plurality of first LED elements and the second illuminating unit comprises a plurality of second LED elements; and
    wherein the first LED elements are mounted on a first ring belt and the second LED elements are mounted on a second ring belt separated from the first ring belt, and wherein the short-range photographic light source module further comprises an optical lens unit mounted between the ring belts and the rear end portion and having a symmetry axis extending along the light axis.

11. The image capture device according to claim 10, wherein the short-range photographic light source module further comprises a power source unit adapted for being mounted on the device body and supplying power to the illuminating units.

12. The image capture device according to claim 10, wherein the front end portion comprises a flat edge such that, in the case wherein the target object has a flat surface, the front end portion can be brought into a close contact with the flat surface of the target object and the light shield portion can block out ambient light interference.

13. The image capture device according to claim 10, wherein the short-range photographic light source module further comprises an adapter base for connecting the sleeve tube to the image capture device, wherein the adapter base is formed with a through hole to accommodate the imaging lens.

14. The image capture device according to claim 10, wherein the short-range photographic light source module further comprises a switch unit electrically connected to the illuminating units for activating the illuminating units.

* * * * *